Figure 1:
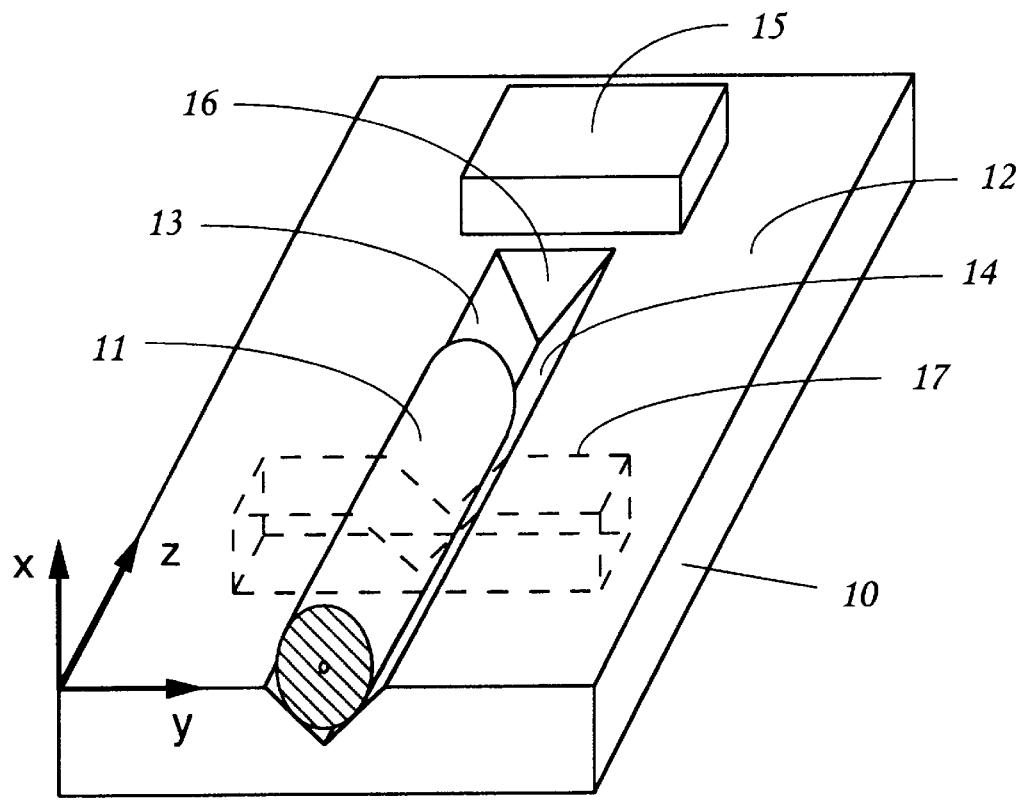

United States Patent [19]
Peall

[11] Patent Number: 5,985,086
[45] Date of Patent: Nov. 16, 1999

[54] SECURING AN OPTICAL FIBRE IN A V-GROOVE

[75] Inventor: Robert George Peall, Harlow, United Kingdom

[73] Assignee: Northern Telecom Limited, Montreal, Canada

[21] Appl. No.: 08/952,676

[22] PCT Filed: Feb. 5, 1997

[86] PCT No.: PCT/GB97/00320

§ 371 Date: Nov. 12, 1997

§ 102(e) Date: Nov. 12, 1997

[87] PCT Pub. No.: WO97/29394

PCT Pub. Date: Aug. 14, 1997

[30] Foreign Application Priority Data

Feb. 8, 1996 [GB] United Kingdom .................... 9602564

[51] Int. Cl.⁶ ............................... G02B 6/24; G02B 6/42
[52] U.S. Cl. .......................... 156/292; 156/293; 156/296; 385/65; 385/83
[58] Field of Search ..................................... 156/180, 292, 156/293, 296, 166; 385/65, 83, 88, 89

[56] References Cited

FOREIGN PATENT DOCUMENTS

96/00918 1/1996 WIPO .

OTHER PUBLICATIONS

IBM Technical Disclosure Bulletin, Sep. 1981, Silicon Optical Bench For Reproducible Optical Feedback Path, pp. 1984–1985.

*Primary Examiner*—Sam Chuan Yao
*Attorney, Agent, or Firm*—Lee, Mann, Smith, McWilliams, Sweeney & Ohlson

[57] ABSTRACT

To minimise the risk of adhesive resin (20, 21) securing an optical fibre (11) in a silicon V-groove (13, 14) from filling the space under the fibre, which can lead to delamination effects resulting from thermal expansion mismatch, a controlled amount of the resin is dispensed into each of two reservoirs (31) located on either side of the groove from which the resin flows into the groove along feeder channels (32) linking the reservoirs to the groove.

5 Claims, 4 Drawing Sheets

SECURING AN OPTICAL FIBRE IN A V-GROOVE

This invention relates to the securing of an optical fibre in a V-groove formed in a substrate surface for the accurate positioning of the fibre relative to that substrate.

For the purposes of this specification, in relation to its associated optical fibre, a V-groove formed in a substrate is a groove having two inwardly inclined planar surfaces for fibre alignment against each of which the curved surface of the associated optical fibre is able to make simultaneous line contact. The V-groove may be defined in its entirety by these planar fibre alignment surfaces meeting in a line at the base of the groove, or it may take a truncated form in which the two planar fibre alignment surfaces are connected by a third surface. Typically such V-grooves, truncated or otherwise, are grooves etched to provide precisely located and oriented planar fibre alignment surfaces using photolithographic techniques involving the anisotropic etching of a crystalline substrate such as a single crystal silicon wafer.

FIG. 1 depicts a substrate 10 with such a V-groove and associated optical fibre 11. The V-groove is formed in a surface 12 of the substrate extending in an yz plane, with the groove extending in the z direction, its two planar fibre alignment surfaces being formed by planes 13 and 14. If the diameter of the fibre 11 is known, then, using the same photolithographic processing to define both the positions of the fibre alignment surfaces 13 and 14 and that of some integer 15 (such as a laser diode, photodetector or waveguide) formed on or secured to the substrate surface, a predetermined alignment of the fibre axis in relation to the integer can be brought about by positioning the curved surface of the fibre in contact with the two fibre alignment surfaces. Typically it is this alignment that is more critical in absolute magnitude terms than the magnitude of the distance separating the end of the fibre from the end of the integer 15, and this latter magnitude is capable of being adjusted by sliding the fibre along the V-groove. At least in principle, this separation distance can also be set to a predetermined value by arranging to advance the fibre until its end surface comes into contact with the end wall 16 of the V-groove.

Figure 2A:
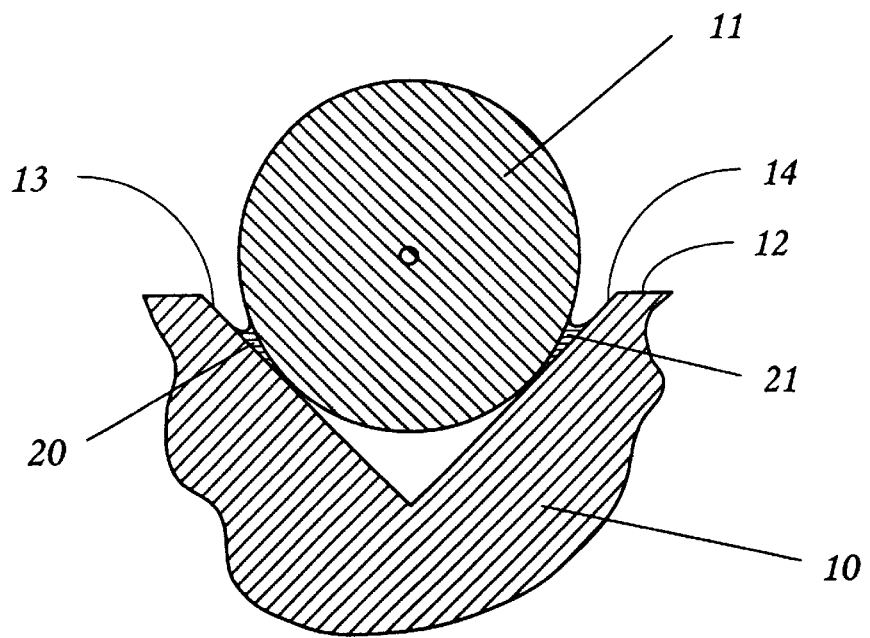
Figure 2B:
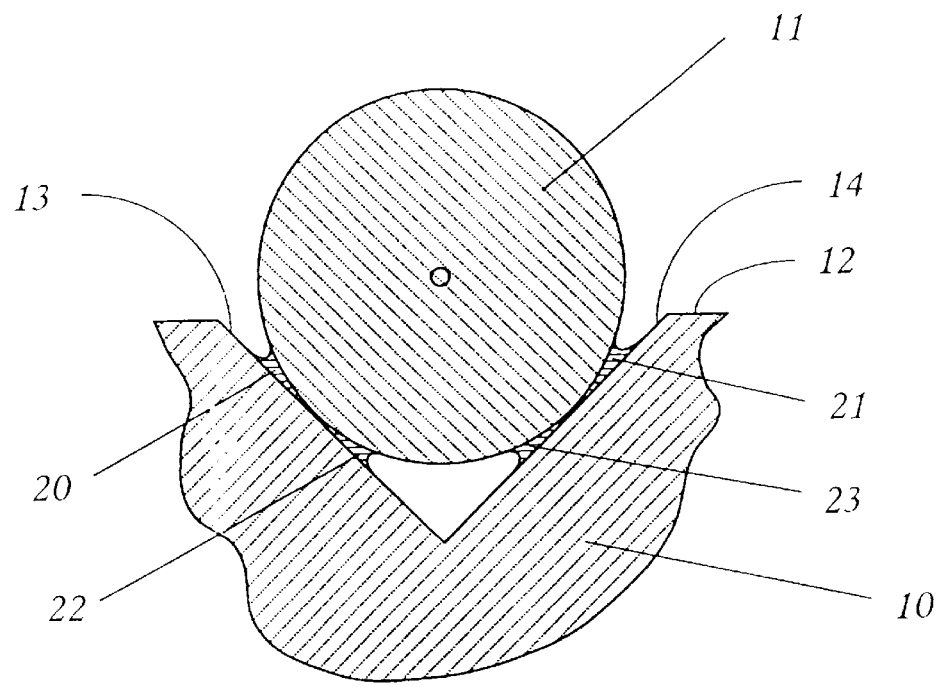
Figure 2C:
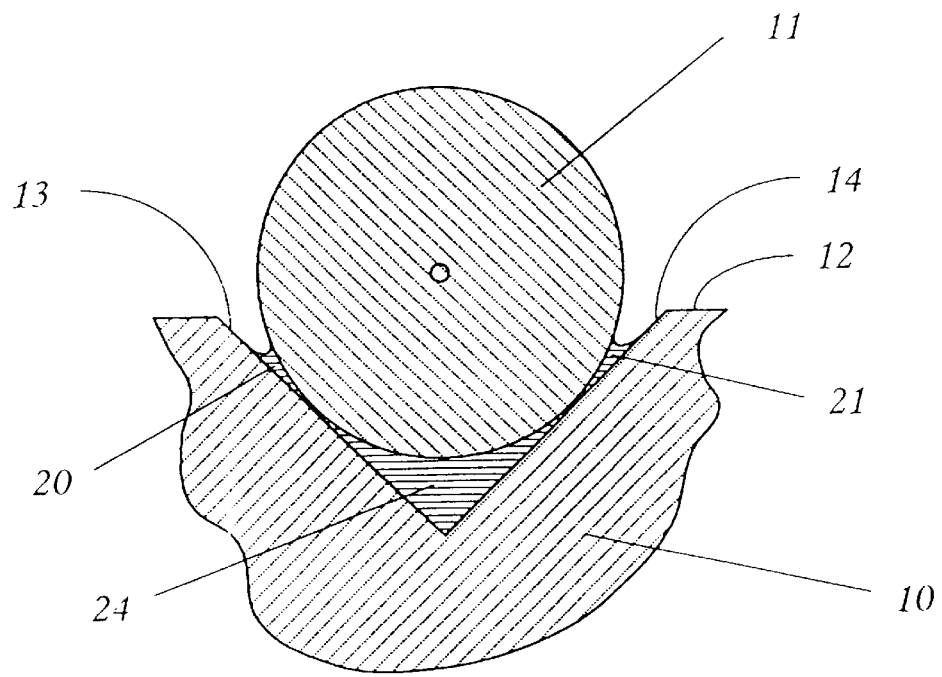

When the optical fibre 11 is in its required position in its associated V-groove formed in substrate 10, having the curved surface of the fibre in simultaneous contact with both of the fibre alignment surfaces 13 and 14, it is generally desired to secure the fibre with some form of adhesive, which may for instance be an adhesive resin or a solder. The fibre may be secured, as depicted in FIG. 2a, with just two fillets 20 and 21 of adhesive above the lines of contact between the fibre and the fibre alignment walls. Additionally, as depicted in FIG. 2b, there may be two further fillets 22 and 23 of adhesive beneath the lines of contact between the fibre and the fibre alignment walls. Alternatively, as depicted in FIG. 2c, the place of the further fillets 22 and 23 may be taken by a single plug 24 of adhesive that completely fills, over at least a portion of the length of the groove, the space lying between the fibre and the substrate beneath the lines of contact between the fibre and the fibre alignment walls. For applying the adhesive mass to form the 24 under the fibre it may be convenient to dispense the adhesive in a slot that transversely intersects the base of the V-groove as described in the article by I P Hall entitled 'Non-hermetic Encapsulation and Assembly Techniques for Optoelectronic Applications' at the 10th European Microelectronics Conference, May 14–17, 1995 Copenhagen, Denmark. (Such a slot is depicted in broken outline at 17 in FIG. 1.) A somewhat similar configuration is also to be found in WO-A-96/00 918.

The method hitherto adopted by us for securing optical fibres in V-grooves has been to clamp the fibre in position in its V-groove, and then to dispense a thermally curable epoxy adhesive resin at an elevated temperature along each side of the fibre directly from a dispenser. It has been found that it is a skilled operation to manipulate an adhesive resin dispenser between the fibre and the groove, and there is also the difficulty that the fibre can not be clamped along its full length in the V-groove because access is required to dispense the resin. It has been found that with this method that if the resin is allowed to run under the fibre to the extend of creating a plug 24 of resin as depicted in FIG. 2c, alignment reliability is impaired. It is believed that one reason for this impairment is that the cured epoxy resin has a tendency to delaminate in the presence of thermal stress during thermal cycling, and that another reason is that the fibre can also be moved away from contact with the alignment surfaces by the greater thermal expansion of the resin plug.

Accordingly it is desired to try and ensure that the dispensing of the resin does not lead to the formation of such a plug of resin under the fibre, an occurrence that is particularly likely if the amount of resin dispensed is not carefully controlled. The present invention is directed to reducing the risk of such plugs being formed.

According to the present invention there is provided a method of securing an optical fibre in a V-groove formed in a surface of a substrate, wherein the V-groove is formed with two inwardly inclined planar surfaces against each of which the curved surface of the fibre makes simultaneous line contact, in which method the fibre is held in contact with said planar surfaces while adhesive is dispensed in reservoirs formed in the substrate surface on either side of the V-groove in sufficient quantity to cause the dispensed adhesive to flow by capillary action first along feeder channels formed in the substrate surface to communicate with the V-groove exclusively above the lines of its contact with the fibre, and then along the V-groove to form fillets of adhesive on either side of the fibre which bond the fibre to said planar surfaces.

The use of a feeder channel for conveying an adhesive medium by capillary action to where it is required in order to secure together the components of an assembly from a remote reservoir into which that adhesive has been dispensed is known from IBM Technical Disclosure Bulletin vol. 24, no. 4, September 1981 pages 1984–1985, XP002018608, L D Comerford: "Silicon optical bench for reproducible optical feedback path", where such a reservoir and feeder channel configuration is used for conveying metallic solder from a reservoir to where that solder is employed for securing a laser diode chip to a silicon substrate in a surface of which the reservoir and feeder channel arrangement is formed.

Figure 3:
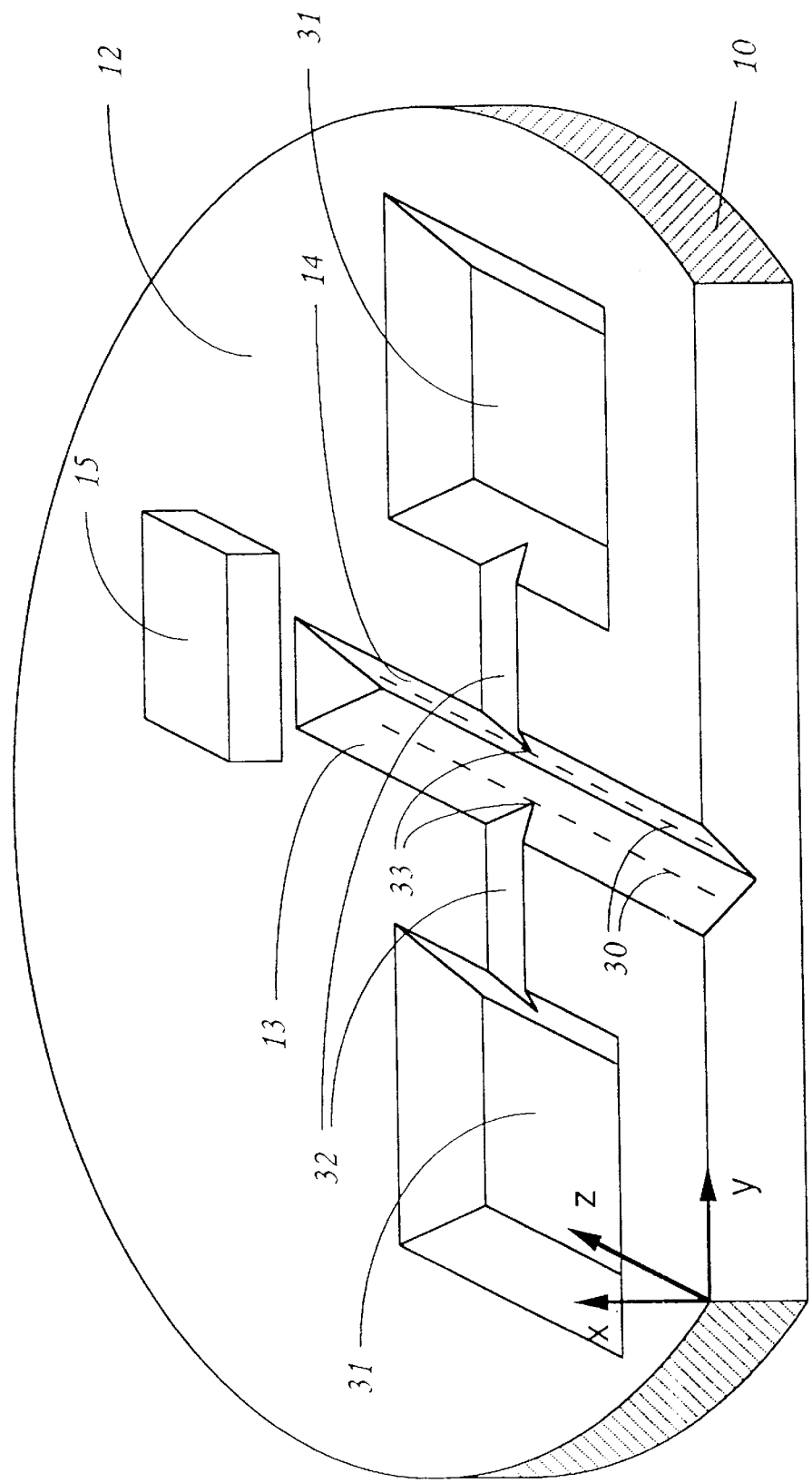
Figure 4:
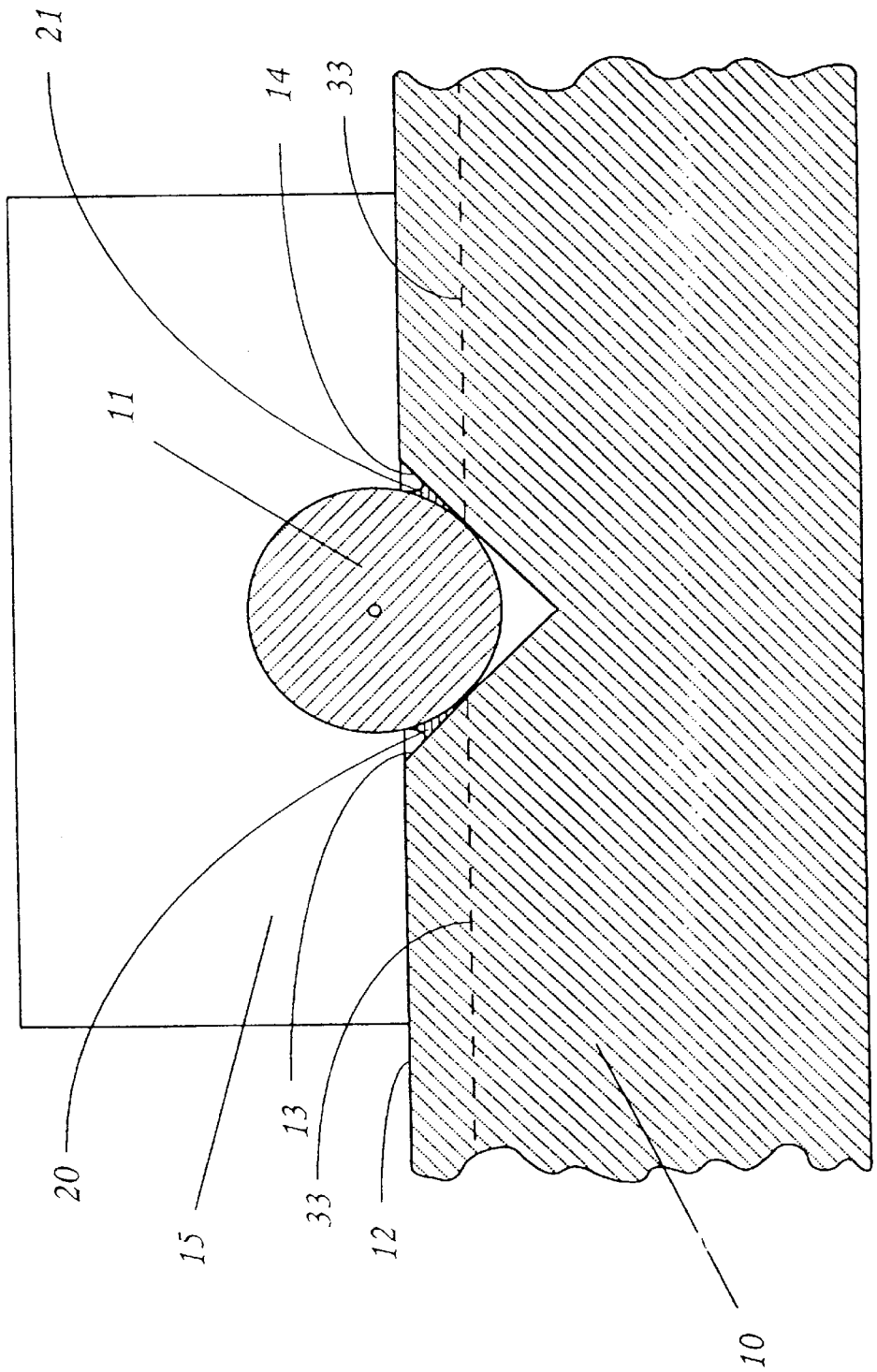

There follows a description of a method of securing an optical fibre in a V-groove, the method embodying the invention in a preferred form. Previous reference having been made to FIGS. 1 to 2c, this description refers to FIGS. 3 and 4 of the accompanying drawings in which:

FIG. 1 is a schematic perspective view of a prior art arrangement of V-groove and fibre, FIGS. 2a, 2b and 2c are schematic cross-sections of fibres secured in V-groove with different arrangements of adhesive fillets, FIG. 3 is a schematic perspective view of a part of a substrate provided with a V-groove, and associated reservoirs and feeder channels, for securing an optical fibre in the groove according to the method embodying the present invention in the preferred form, and FIG. 4 is a schematic sectional view of part of the substrate of FIG. 3 after the securing of an optical fibre in its V-groove.

Referring to FIG. 3, etched into the surface 12 silicon substrate 10, is a V-groove with inwardly facing planar surfaces 13 and 14 for aligning an optical fibre 11 (FIG. 4). For illustrative convenience, the planar alignment surfaces 13 and 14 of the V-groove are depicted in FIG. 3 as meeting at the base of the V-groove, but alternatively they may form parts of a truncated V-groove that are connected by a third surface. The position of the lines of contact between the fibre and the alignment surfaces are indicated in FIG. 3 by broken lines 30. The etching of the V-groove is performed simultaneously with the etching of a pair of wells 31 constituting reservoirs for adhesive, and also the etching of a pair of feeder channels 32 linking the reservoirs to the V-groove. The feeder channels 32 are dimensioned so that the bottom 33 of each feeder channel is at approximately the same level as the lines of contacts 30 in the main V-groove. When etching the feeder channels simultaneously with the etching of the V-groove, the feeder channels are also anisotropically etched, and the depth of the feeder channels can readily be determined by appropriate choice of their width dimension.

Secured to, or formed directly or indirectly on, the substrate 10 in registering with the V-groove is an optoelectronic or optical integer 15, such as a diode laser, a photodetector, or waveguide, with which the optical fibre 11 is to be optically coupled when secured in position in the groove. A clamp (not shown) is employed to clamp the end of the fibre 11 lightly in the V-groove, preferably along the whole length of the fibre in the V-groove, so as to constrain the fibre axis to lie along the line of the V-groove with its x and y co-ordinates determined by the shape and arrangement of the fibre alignment surfaces 13 and 14 in relation to the diameter of the fibre. At this juncture small adjustment in the z direction may be made to optimise the optical coupling between the fibre and the integer 15 before the fibre is more firmly clamped in the V-groove preparatory for the application of adhesive resin to the reservoirs 31.

A measured quantity of fluid adhesive resin, typically a quantity of hot thermally curing epoxy resin, is applied to each reservoir, from where it flows by capillary action along the feeder channels 32 and into the V-groove to form fillets 20 and 21 of adhesive lying above the lines of contact between the fibre 11 and the fibre alignment surfaces 13 and 14. The clamp is released after the resin has been allowed to cure so as to leave the fibre secured in the V-groove by the cured resin fillets.

The dispensing of the adhesive resin into the reservoirs 31, rather than directly between the fibre 11 and the fibre alignment walls 13 and 14, simplifies the procedure in a number of ways. For example the degree of operator skill required is reduced because the adhesive resin dispenser does not require to be positioned with such accuracy when dispensing into the reservoirs instead of between the fibre and fibre alignment walls. The fibre can readily be clamped along the whole of its length within the V-groove because direct access for the adhesive resin dispenser to the interface between the fibre and the fibre alignment walls is no longer required. The reservoirs have a capacity that is large compared with the amount of resin in an individual fillet 20, 21, and hence control over dispensing an appropriate amount of resin is facilitated having regard to the fact that it is difficult to dispense accurately and in a controlled manner the very small droplets of resin required for direct application to the fibre/V-groove interface. Because of the self-limiting nature of the arrangement of V-groove, reservoirs and feeder channels, adhesive resin is fed to the V-groove at the correct height to ensure a good fillet geometry above the lines of contact between the fibre and the fibre alignment wall. In view of all these factors, the risk of dispensing too much resin, and of it wicking under the fibre is considerably reduced.

Although the foregoing specific description has related exclusively to the use of an epoxy resin as the preferred adhesive for securing the fibre in the V-groove, it will be evident that the invention is applicable also in instances where other types of adhesive are employed, not only other types of adhesive resin but also other types of adhesive including solder.

I claim:

1. A method of securing an optical fibre in a V-groove formed in a surface of a substrate, wherein the V-groove is formed with two inwardly inclined planar surface against each of which the curved surface of the fibre makes simultaneous line contact, which method comprises the steps of holding the fibre in contact with said planar surfaces and, while said contact is held, dispensing adhesive in reservoirs formed in the substrate surface on either side of the V-groove in sufficient quantity to cause the dispensed adhesive to flow by capillary action first along feeder channels formed in the substrate surface to communicate with the V-groove exclusively above the lines of its contact with the fibre, and then along the V-groove to form fillets of adhesive on either side of the fibre which bond the fibre to said planar surfaces.

2. A method as claimed in claim 1, wherein the adhesive dispensed is a resin adhesive.

3. A method as claimed in claim 2, wherein the adhesive dispensed is an epoxy resin adhesive.

4. A substrate provided with a V-groove in which an optical fibre is secured by the method claimed in claim 1.

5. A device having an optical fibre secured in a V-groove in a substrate by adhesive fillets between the fibre and the V-groove walls, there being an adhesive feeder channel in the substrate on each side of the groove, each feeder channel extending between an associated adhesive reservoir formed in the substrate and the V-groove, and communicating with said V-groove exclusively above the lines of its contact with the fibre.

* * * * *